United States Patent [19]

Wengert

[11] Patent Number: 4,860,196
[45] Date of Patent: Aug. 22, 1989

[54] HIGH-AVAILABILITY COMPUTER SYSTEM WITH A SUPPORT LOGIC FOR A WARM START

[75] Inventor: Ulrich Wengert, Beaverton, Oreg.

[73] Assignee: Siemens Aktiengesellschaft, Berlin and Munich, Fed. Rep. of Germany

[21] Appl. No.: 936,523

[22] Filed: Dec. 1, 1986

[51] Int. Cl.$^4$ .............................................. G06F 15/16
[52] U.S. Cl. ................................. 364/200; 364/268.4; 364/280.2; 364/285.2; 364/281.9
[58] Field of Search ... 364/200 MS File, 900 MS File; 371/9, 11, 12

[56] References Cited

U.S. PATENT DOCUMENTS 4,358,823 11/1982 McDonald et al. ............... 364/200
4,503,534 3/1985 Budde et al. ..................... 364/200 X Primary Examiner—Thomas M. Heckler

[57] ABSTRACT

High availability computer systems as their name implies are available or "on" virtually all the time and thus the system must be able to recover or restart after the occurrence of one of the errors which occur at least at a statistical rate. If one logical processor of a functional redundancy checked pair is always assigned as the core processor unit for the restart initialization, the system has essentially a single failure point that seriously degrades its availability. This system by including supporting logic which cycles which logical processor of a FRC pair is assigned as the core processors for each subsequent restart removes the single point failure possibility.

1 Claim, 2 Drawing Sheets

HIGH-AVAILABILITY COMPUTER SYSTEM WITH A SUPPORT LOGIC FOR A WARM START

FIELD OF THE INVENTION

This invention relates to electronic data processing systems, and more particularly to such systems having redundant processors and redundant bus systems.

BACKGROUND OF THE INVENTION

Upon the warm start of an entire computer system or of a portion of said system, particularly in redundantly designed configurations having at least two logic processors, it is necessary to provide a decision procedure to define one of the processors as a Master and to define another of the processors as a Checker. When a start of the computer system is performed after previous operation, information is thus needed on the distribution of data in various memory devices throughout the computer system at the time of interruption of operation. Such starts are called warm starts or restarts as the system is in the midst of operation, rather than initializing from a powerless, dormant condition, at the time it is instructed to start over. High availability computers, as their name denotes, are virtually never completely turned off; thus, almost all of the starts experienced in operation will be such warm starts. Further, to enhance the computer's availability, it is desirable that the core processor performing the warm start or restart operation rotate among possible logic processors to eliminate a possible single point failure.

SUMMARY OF THE INVENTION

It is an object of this invention to control the assignment of the logic processors to operating status in such a manner that in the course of several start phases, i.e., warm start or restart, each logic processor component is certain to be enabled at least once to control the initialization phase, thereby minimizing the likelihood that the system will fail because of a failure of one of the processors which is the one controlling the initialization phase.

Briefly stated, in accordance with one aspect of the invention, the aforementioned object of the invention can be achieved by providing a high availability computer system including a plurality of general data logic processors connected respectively as Master/Checker pairs having two logical processors to a general data processor, said logical processors being connected to one another within the general data processor module by a local bus and a bus extension unit, the bus extension unit is connected further to a system bus, thereby providing data communication to all of the computer system. A parameter controller communicates through at least one COM-line and at least one respective COM-pin of each bus extension unit to control identification and parameterization during a physical system initialization. Each bus extension unit has an INIT (initialization) counter which is maintained by the parameter controller during each initialization. Each of the general data processors thus connected to its bus extension unit reads its respective INIT counter and decides whether to continue data processing or to stop. Each general data processor receives either a Master or a Checker identification during initialization and stores this identification. Identification and parameterization are always assigned the same way, such that a logic 0 or a logic 1 of the general data processors always starts the same process, and each INIT counter is incremented after each warm start such that on each subsequent warm start the general data processor performing the initialization is a different one from the previous general data processor performing the initialization.

With the help of the stated assignment strategy, it is ensured that each logical processor can be enabled to control a warm start of the system. When the system is switched on, i.e., a cold start, the INIT counter is set to zero; on each warm start, it is incremented by one, so that a different assignment of the Master-Checker priority of a processor pair within a computer module can be established each time. In this way, for example, if a warm start takes place after the detection of an error in the system, the next initialization is performed with a different assignment of the processors, thus enabling the system to analyze the error if it was caused by switching problems of the preceding active processor.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
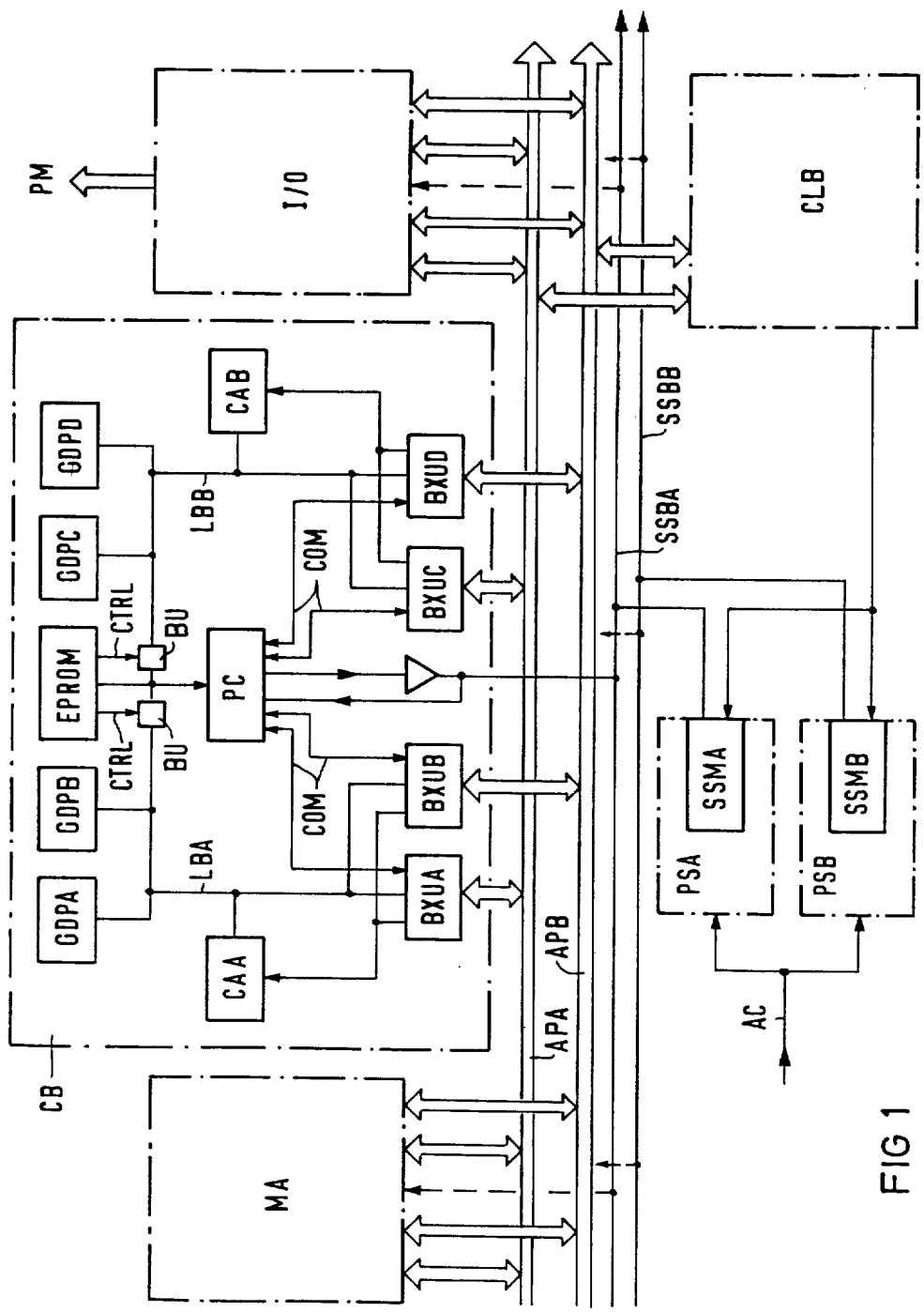
FIG. 1 shows a block diagram of a preferred embodiment of a computer system.

FIG. 1 shows a block diagram of a computer system with a computational board CB on which there are four processor modules GDPA, GDPB, GDPC and GDPD, where GDP stands for general data processor. Like most of the computer modules described in that which follows, the processor modules are VLSI components. Each pair of processor modules GDPA and GDPB or GDPC and GDPD form a unit, in which each one of the modules, as controlled by hardware or software, is allotted the Master function or the subordinate Checker function. In the present circuit embodiment, the processor modules GDPA and GDPB as well as GDPC and GDPD are each connected through a local bus LB to bus extension units BXUA and BXUB, as well as to bus extension units BXUC and BXUD respectively, each of the bus extension units BXUA and BXUC being connected to an Advanced Processor system bus, APA, and each of the bus extension units BXUB and BXUD being connected to a further redundant Advanced Processor system bus APB.

In a further block, not shown in greater detail, there is present a memory array MA which, with the corresponding memory components and associated control modules, forms the addressable memory space of the computer system. Furthermore, the bus extension units BXUA and BXUB as well as BXUC and BXUD are each connected through a communication line COM to one terminal of a parameter controller PC. Parameter controllers can be microprocessor devices such as the 8051 device, for example, made by Intel. At further inputs of the parameter controller PC, certain parameters of the computational board can be externally set by analog or digital setting means or with data stored in an EPROM. An error-message unit can be connected through an output, not shown here, of the parameter controller PC. The error-message unit sends a signal if an error occurs in the modules monitored by the parameter controller module PC. The input of the parameter controller that is connected to the EPROM memory unit is connected to the local bus LBA of the first pair of processor units GDPA and GDPB by a buffer memory BUA, and to the local bus LBB of the second pair of processor units GDPC and GDPD by a buffer memory BUB. Furthermore, control lines are provided between the buffer memories BUA, BUB and the memory unit EPROM.

FIG. 1 further shows two serial system support buses SSBA and SSBB, by means of which the parameter controller modules PC of the several computational boards are connected to one another. In this redundant embodiment of the system support buses SSBA and SSBB, redundant embodiments of each of the computer units MA, CB and I/O, not shown here, are connected to the second bus SSBB. A detailed functional description of the modules shown in FIG. 1 follows below.

The right-hand portion of FIG. 1 also contains a block representing the input-output unit I/O of the computer system described here, the circuit at this point not being dealt with in detail. This I/O unit connects the computer system to peripheral devices PM by means of well-defined data-transfer protocols, e.g., Ethernet, etc.

The bottom portion of FIG. 1 shows an overall plan of two identical power supply modules PSA and PSB, with the power-supply lines AC. In addition to the d.c. power supply terminals not shown here, the power supply modules PSA and PSB have two system support modules SSMA and SSMB, each of which is provided with a microprocessor, such as an Intel 8051 or similar device. Outputs of the system support modules SSMA and SSMB are connected to the system support buses SSBA and SSBB respectively. The system support modules SSMA and SSMB are further supplied by means of clock lines with the system clock pulse from a clock generator module CLB.

Figure 2:
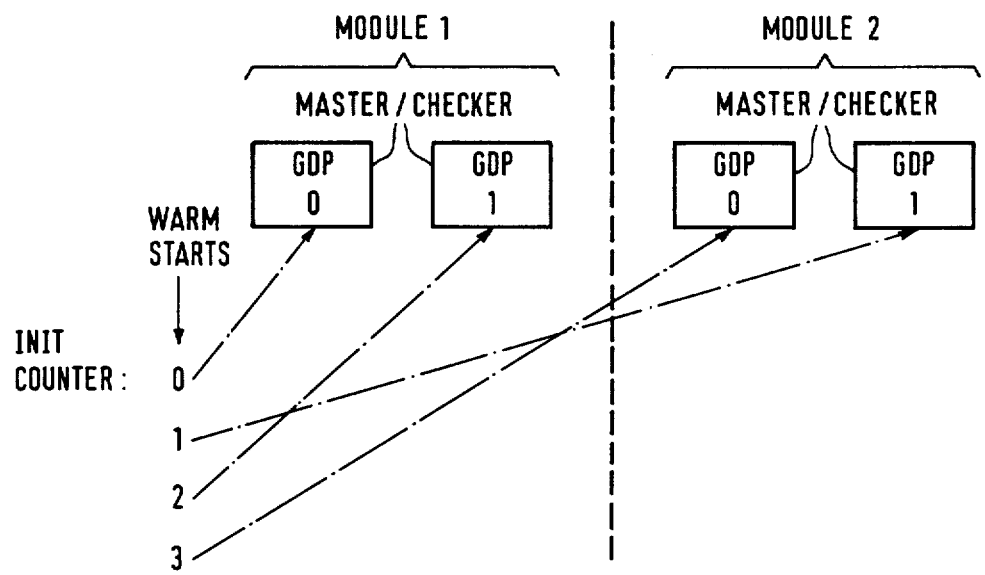
FIG. 2 shows an assignment scheme for the assignment of Master and Checker functions to the processors during each warm start of the computer system.

FIG. 2 shows an example with a configuration of two logical processors GDP0 and GDP1 in each of two processor modules 1 and 2, to which logical processors Master or Checker functions are assigned respectively in the manner described as the numerical value in the INIT counter is incremented. After every warm start of the system or parts thereof, the initialization process is performed by the processors in accordance with the following table, which clarifies the diagram shown in FIG. 2:

| INIT-Count Modulo 4 | Continue GDP # | Continue Bus | Continue Module # |
| --- | --- | --- | --- |
| 0 | 0 | local 0 | 1 |
| 1 | 1 | local 1 | 2 |
| 2 | 1 | local 0 | 1 |
| 3 | 0 | local 1 | 2 |

The table was compiled under the following assumption:
Processor board with four processors; unit connected in a Functional Redundancy Check Module Configuration
Local bus 0 = Master bus (with processor 0 and processor 1)
Local bus 1 = Checker bus (with processor 0 and processor 1)
Processor 0, bus 0/1 = logical processor 0
Processor 1, bus 0/1 = logical processor 1

Any cold start ensurres that the module is started in the Functional Redundancy Checked, FRC, mode. That is, both physical processors of a logical processor execute exactly the same commands. The INIT counter is used to stop one of the two logical processors during initialization. At the moment when the FRC logic detects an FRC error in the processor module, the FRC logic immediately stops the module. The next restart of the system and all subsequent restarts cause the FRC logic to split the module; that is, the module no longer has a FRC logical configuration. The FRC logic cannot, however, tell on which local bus the unit with the error is; and which unit, e.g., which of the two physical processors 0/1 on a local bus, the error is in.

At this point, the INIT counter comes into prominence. First, the FRC logic ensures that the system alternates between local buses 0 and 1 on every system restart subsequent to the FRC error. The bus not in use at the respective time is inactive. It is quite possible for the unit with the error to be on the currently active bus. If the same processor were always started during a warm start or a cold start, there would be a certain probability that it would always be precisely the processor with the error. The INIT counter ensures that each of the preferably four logical processor groups can initialize the system once.

It is thus ensured that all processors are responsible for initialization in a series of warm starts, the cyclic alternation being not just between the two logical processors of one unit or pair, but also back and forth between units or pairs 1 and 2.

It will now be understood that there has been disclosed an improved high-availability computer system with support logic for a warm start. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and scope of the invention.

What is claimed as new and desired to be secured by Letters Patent of the United States:

1. A high availability computer system comprising:
a plurality of general data processors connected respectively as Master/Checker pair units having two processors to each said data processor unit, said processors being connected to one-another within the processor unit by a local bus and connected to a bus extension unit;
the bus extension unit being connected further to a system bus, thereby providing data communication to all of the computer system;
a parameter controller communicating through at least one COM-line to each bus extension unit to control identification and parameterization during a system initialization;
each bus extension unit including an INIT counter maintained by said parameter controller during each initializaton;
each of said processors thus connected to its bus extension unit reading its respective INIT counter and deciding whether to continue data processing or to stop;
each said processor receiving either a Master or a Checker identification during initialization and storing said identification;

identification and parameterization being always assigned the same way such that a logic 0 or a logic 1 of said processor always starts the same process; and each INIT counter being incremented after each warm start such that on each subsequent warm said processor performing the initialization is different from the previous processor performing the initialization.

* * * * *